No. 860,545.
PATENTED JULY 16, 1907.
J. E. HOWELL.
BUTT CHISEL.
APPLICATION FILED APR. 1, 1907.
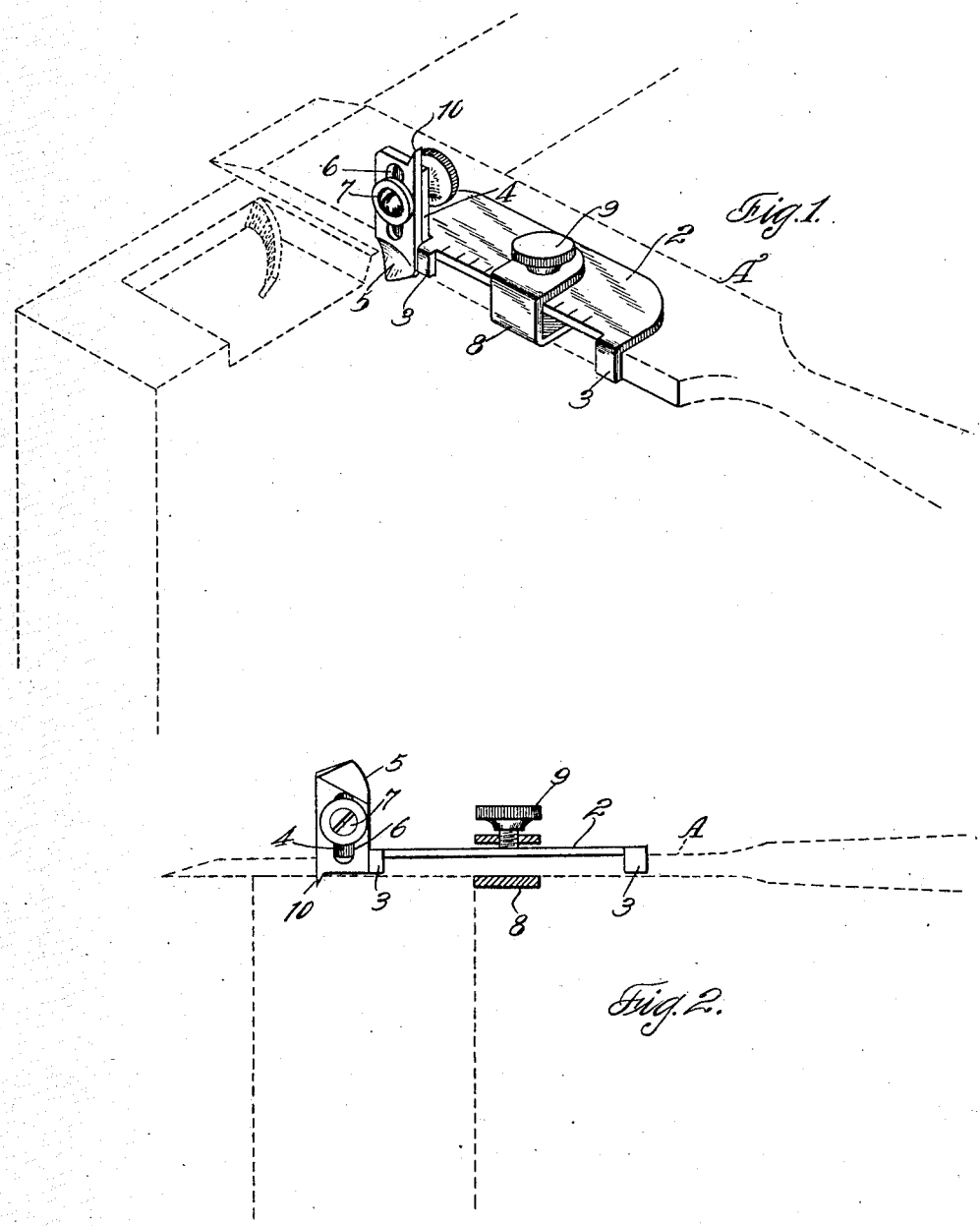
WITNESSES:
INVENTOR:
John E. Howell;
BY
Geo. H. Strong.
ATTORNEY

UNITED STATES PATENT OFFICE.

JOHN E. HOWELL, OF UKIAH, CALIFORNIA.

BUTT-CHISEL.

No. 860,545.  Specification of Letters Patent.  Patented July 16, 1907.

Application filed April 1, 1907. Serial No. 365,827.

*To all whom it may concern:*

Be it known that I, JOHN E. HOWELL, a citizen of the United States, residing at Ukiah, in the county of Mendocino and State of California, have invented new and useful Improvements in Butt-Chisels, of which the following is a specification.

My invention relates to a tool which is especially designed for cutting the seats for butt hinges and for like work.

It consists of a removable attachment for chisels, said attachment carrying a cutter and gage; and in a combination of parts and details of construction which will be more fully explained by reference to the accompanying drawings—

Figure 1 is a perspective view of a butt-chisel embodying my invention. Fig. 2 is a side elevation showing the clamp in section.

It is the object of my present invention to provide an attachment carrying the gage and cutter which may be applied to any chisel or tool upon which it can be used.

A is a chisel of any usual or ordinary construction having a cutting edge, and 2 is a plate having downwardly turned lugs 3 which form stops to contact with the edge of the chisel blade as shown.

4 is an upturned portion also formed with the plate. This upturned portion serves as a support for the cutting member 5. This member is slotted as at 6, and through the support 4 is made a hole in line with the slot. A screw 7 passes through the hole and slot, and by tightening it the cutting blade or member is secured to the support, so that its cutting edge projects below the lower surface of the chisel. This device is secured to the chisel by means of a yoke or clamp 8, and the screw with milled head as shown at 9; the clamp fitting over the chisel and the plate 2, and the screw serving to hold the parts rigidly together. The clamp also serves as a gage or stop to limit the distance to which the cutter 5 may be advanced, and this adjustment is made by loosening the thumb screw and moving the gage along the edge of the plate and chisel so that it will contact with the edge of the piece to be mortised at a point where the cutting blade has reached the end of the cut which it is to make.

The upper end of the blade 5 has a scribing point 10 projecting at the angle opposite to the edge of the cutter 5, so that by loosening the clamping nut, the blade may be reversed about the shank of the pin and the scribing point turned downwardly.

The size of the hinge for which the mortise is to be made having been determined, the cutting blade is inverted, with the scribing point extending downward below the lower surface of the chisel, when the latter is laid flat upon the part to be mortised, and the gage clamp 8 being set so that this scribing point will show the distance that the cut is to be made from the edge of the part in which the hinge is to be set. The whole device may be moved along parallel with the edge of said part, and the scriber will make the required mark to show the width. The blade may then be loosened and reversed, and the cutting edge will be brought to stand at the same point which was previously occupied by the scriber, and the distance to which the cut is to be made will be determined. The ends of the cut will be also marked with lines at right angles with the line which indicates the distance to which the edge of the hinge is set from the edge of the part to which it is to be affixed. The marking having been completed, the chisel is laid flatwise upon the part where the hinge seat is to be cut, and by pushing a chisel transversely across it, the cutter 5 will shear away a portion of the wood at each impulse of the chisel across the wood; the chisel being advanced in the direction of the length of the seat after each cut so as to remove another portion and so on until the entire length of the cut is made between the transverse marks.

The inclined position of the blade insures the wood being cut more smoothly and easily than if it was exactly vertical.

Where the cuts are finished there will remain an inclined wall corresponding with the inclined position of the cutting blade. This may afterwards be made vertical by turning the chisel at such an angle that the cutting edge stands in a vertical position, then making a final cut with it.

If the excavation or seat has not a perfect surface this may be finished by the edge of the chisel which may be passed over the surface like a plane, and the vertical longer side may also be trimmed in a plane by the use of a chisel in the same manner.

Having thus described my invention, what I claim and desire to secure by Letters Patent is—

1. A chisel attachment for cutting seats for hinges and the like, said attachment including a removable plate, a cutting blade secured to said plate, said blade extending above and below the plate and having its cutting edge disposed at an angle with the plate, a clamp by which the plate may be secured to the chisel edge, so that the blade will cut transversely at each forward movement of the chisel.

2. A hinge and like seat, cutting attachment for chisels, said attachment consisting of a plate adapted to fit the surface of the chisel, having downwardly turned lugs contacting with the edge of the chisel, an upturned perforated portion near the front end of the plate, a slotted cutting blade fitting the upturned portion, and a screw by which it is locked in position, said blade having an inclined cutting edge, a movable clamp by which the plate is secured to the chisel, said clamp serving as a gage to limit the length of the cut made by the blade.

3. In a hinge seat-cutter of the character described, a plate having guide lugs upon one edge, a combined clamp and gage by which the plate is secured to the edge of a chisel, an upwardly projecting part at the front end of the plate, a transversely cutting member having an inclined edge and a vertical slot, a screw by which said member is adjustably secured to the upturned part, said cutter having a scribing point at the upper corner, diagonally opposed from the cutting edge, said scribing point, when the blade is reversed serving to mark the line which is the termination of the cut made by the blade when the latter has been again returned to its cutting position.

4. In a seat cutter of the character described, a plate having lugs upon one edge, and an adjustable securing gage and clamp, said plate having an upturned perforated support near one end, a bolt fitting the perforation, a slotted plate adjustable and reversible upon the bolt, said plate having a scribing point at one angle, and a cutting edge at the angle diagonally opposite, said cutter registering with the mark made by the scribing point when reversed upon the bolt.

In testimony whereof I have hereunto set my hand in presence of two subscribing witnesses.

JOHN E. HOWELL.

Witnesses:
MABEL BUSCH,
J. M. MANNON.